United States Patent [19]
Penoyer

[11] Patent Number: 5,892,297
[45] Date of Patent: Apr. 6, 1999

[54] POWER TRANSFER SYSTEM

[76] Inventor: Carlton L. Penoyer, 1151 Joanne La., Telford, Pa. 18969

[21] Appl. No.: 788,388

[22] Filed: Jan. 27, 1997

[51] Int. Cl.[6] ........................................................ H02J 9/00
[52] U.S. Cl. ................................................ 307/64; 307/86
[58] Field of Search .................................. 307/64, 66, 43, 307/84, 85–87, 141–141.8; 320/2, 12, 123

[56] References Cited

U.S. PATENT DOCUMENTS

| | | | |
|---|---|---|---|
| 3,636,368 | 1/1972 | Sia | 307/66 |
| 4,604,565 | 8/1986 | Yokota et al. | 307/84 |

*Primary Examiner*—Richard T. Elms

[57] ABSTRACT

A power transfer system includes four relays for switching power from a primary power supply to an auxiliary power supply having a starter motor and a kill switch. A first relay couples the primary power supply to the load. A second relay is responsive to the failure of the primary power supply and activates the starter motor and deactivates the kill switch. A third relay is responsive to power supplied by the auxiliary power supply and couples the auxiliary power supply to the load. A fourth relay is responsive to power supplied by the auxiliary power supply and decouples the primary power supply from the load and deactivates the starter. An optional time delay relay is provided for delaying the activation of the starter motor upon the loss of power supplied by the primary power supply.

4 Claims, 2 Drawing Sheets

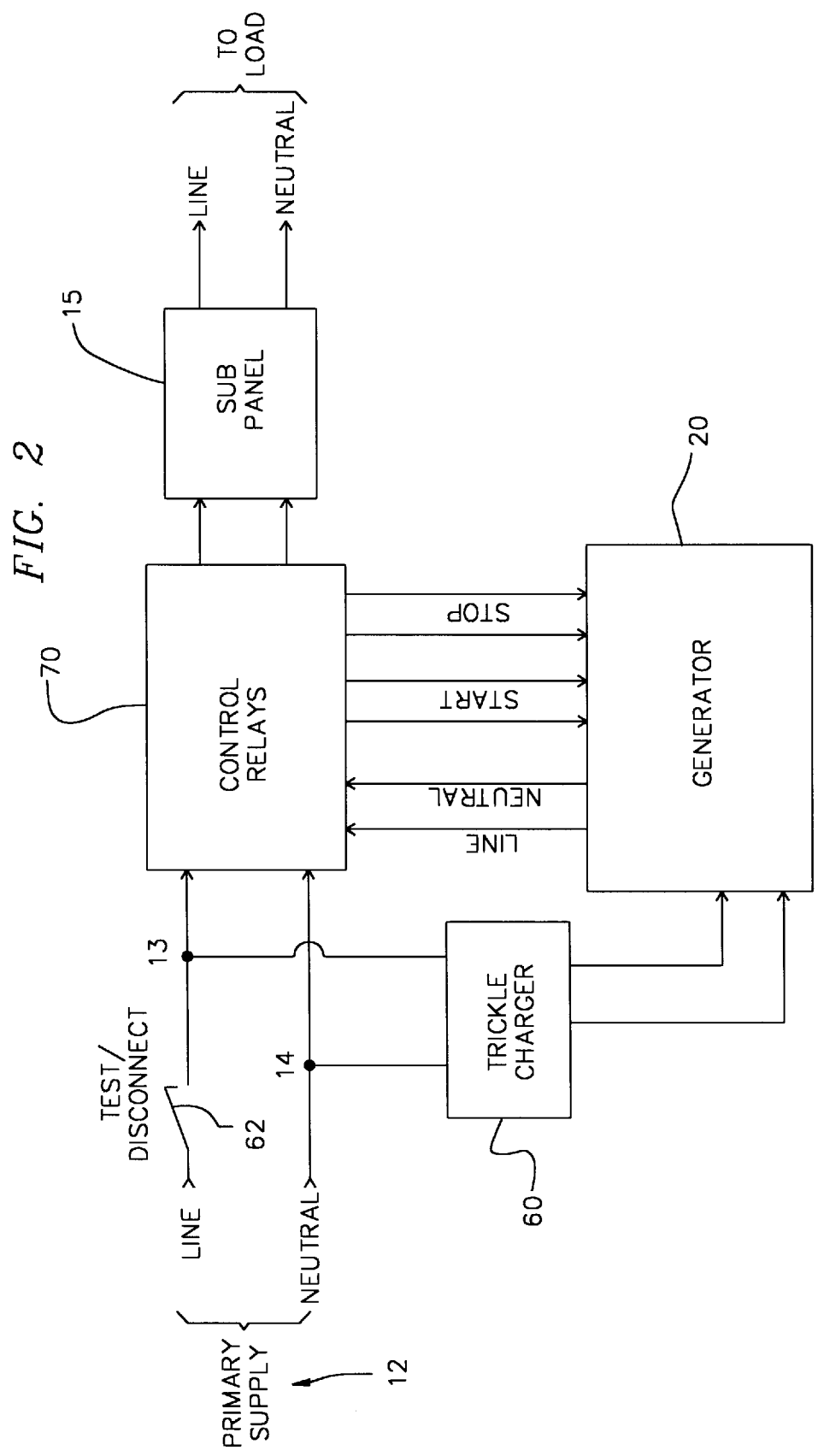

POWER TRANSFER SYSTEM

BACKGROUND OF THE INVENTION

1. Field of the Invention

The present invention relates to systems for providing backup power to a primary power supply and more particularly pertains to a new Power Transfer System for cost effectively providing backup power which is easily installable.

2. Description of the Prior Art

The use of systems for providing backup power to a primary power supply is known in the prior art. More specifically, prior art systems for providing backup power to a primary power supply heretofore devised and utilized are known to consist basically of familiar, expected and obvious structural configurations, notwithstanding the myriad of designs encompassed by the crowded prior art which have been developed for the fulfillment of countless objectives and requirements.

Known prior art systems for providing backup power to a primary power supply include U.S. Pat. No. 4,879,624; U.S. Pat. No. 4,675,539; U.S. Pat. No. 5,191,229; U.S. Pat. No. 5,268,850; U.S. Pat. No. 4,703,191 and U.S. Pat. No. 4,044,268.

While these devices fulfill their respective, particular objectives and requirements, the aforementioned patents do not disclose a new Power Transfer System. The inventive device includes four switching means for switching power from the primary power supply to an auxiliary power supply having a start means and a stop means. A first switching means couples the primary power supply to the load. A second switching means is responsive to the failure of the primary power supply and activates the start means and deactivates the stop means. A third switching means is responsive to power supplied by the auxiliary power supply and couples the auxiliary power supply to the load. A fourth switching means is responsive to power supplied by the auxiliary power supply and decouples the primary power supply from the load and deactivates the start means.

In these respects, the Power Transfer System according to the present invention substantially departs from the conventional concepts and designs of the prior art, and in so doing provides an apparatus primarily developed for the purpose of cost effectively providing backup power which is easily installable.

SUMMARY OF THE INVENTION

In view of the foregoing disadvantages inherent in the known types of systems for providing backup power to a primary power supply now present in the prior art, the present invention provides a new Power Transfer System construction wherein the same can be utilized for cost effectively providing backup power which is easily installable.

The general purpose of the present invention, which will be described subsequently in greater detail, is to provide a new Power Transfer System and method which has many of the advantages of the systems for providing backup power to a primary power supply mentioned heretofore and many novel features that result in a new Power Transfer System which is not anticipated, rendered obvious, suggested, or even implied by any of the prior art systems for providing backup power to a primary power supply, either alone or in any combination thereof.

To attain this, the present invention generally comprises four switching means for switching power from the primary power supply to an auxiliary power supply having a start means and a stop means. A first switching means couples the primary power supply to the load. A second switching means is responsive to the failure of the primary power supply and activates the start means and deactivates the stop means. A third switching means is responsive to power supplied by the auxiliary power supply and couples the auxiliary power supply to the load. A fourth switching means is responsive to power supplied by the auxiliary power supply and decouples the primary power supply from the load and deactivates the start means. The switching means employed include electromechanical relays that must be of durable construction and able to operate reliably over extended periods of time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new Power Transfer System and method which has many of the advantages of the systems for providing backup power to a primary power supply mentioned heretofore and many novel features that result in a new Power Transfer System which is not anticipated, rendered obvious, suggested, or even implied by any of the prior art systems for providing backup power to a primary power supply, either alone or in any combination thereof.

It is another object of the present invention to provide a new Power Transfer System which may be easily and efficiently manufactured and marketed.

It is a further object of the present invention to provide a new Power Transfer System which is of a durable and reliable construction.

An even further object of the present invention is to provide a new Power Transfer System which is susceptible of a low cost of manufacture with regard to both materials and labor, and which accordingly is then susceptible of low prices of sale to the consuming public, thereby making such Power Transfer System economically available to the buying public.

Still yet another object of the present invention is to provide a new Power Transfer System which provides in the apparatuses and methods of the prior art some of the advantages thereof, while simultaneously overcoming some of the disadvantages normally associated therewith.

Still another object of the present invention is to provide a new Power Transfer System for cost effectively providing backup power which is easily installable.

Yet another object of the present invention is to provide a new Power Transfer System which includes four switching means for switching power from the primary power supply to an auxiliary power supply having a start means and a stop means. A first switching means couples the primary power supply to the load. A second switching means is responsive to the failure of the primary power supply and activates the start means and deactivates the stop means. A third switching means is responsive to power supplied by the auxiliary power supply and couples the auxiliary power supply to the load. A fourth switching means is responsive to power supplied by the auxiliary power supply and decouples the primary power supply from the load and deactivates the start means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a block diagram of the preferred embodiment.

DESCRIPTION OF THE PREFERRED EMBODIMENT

Figure 1:
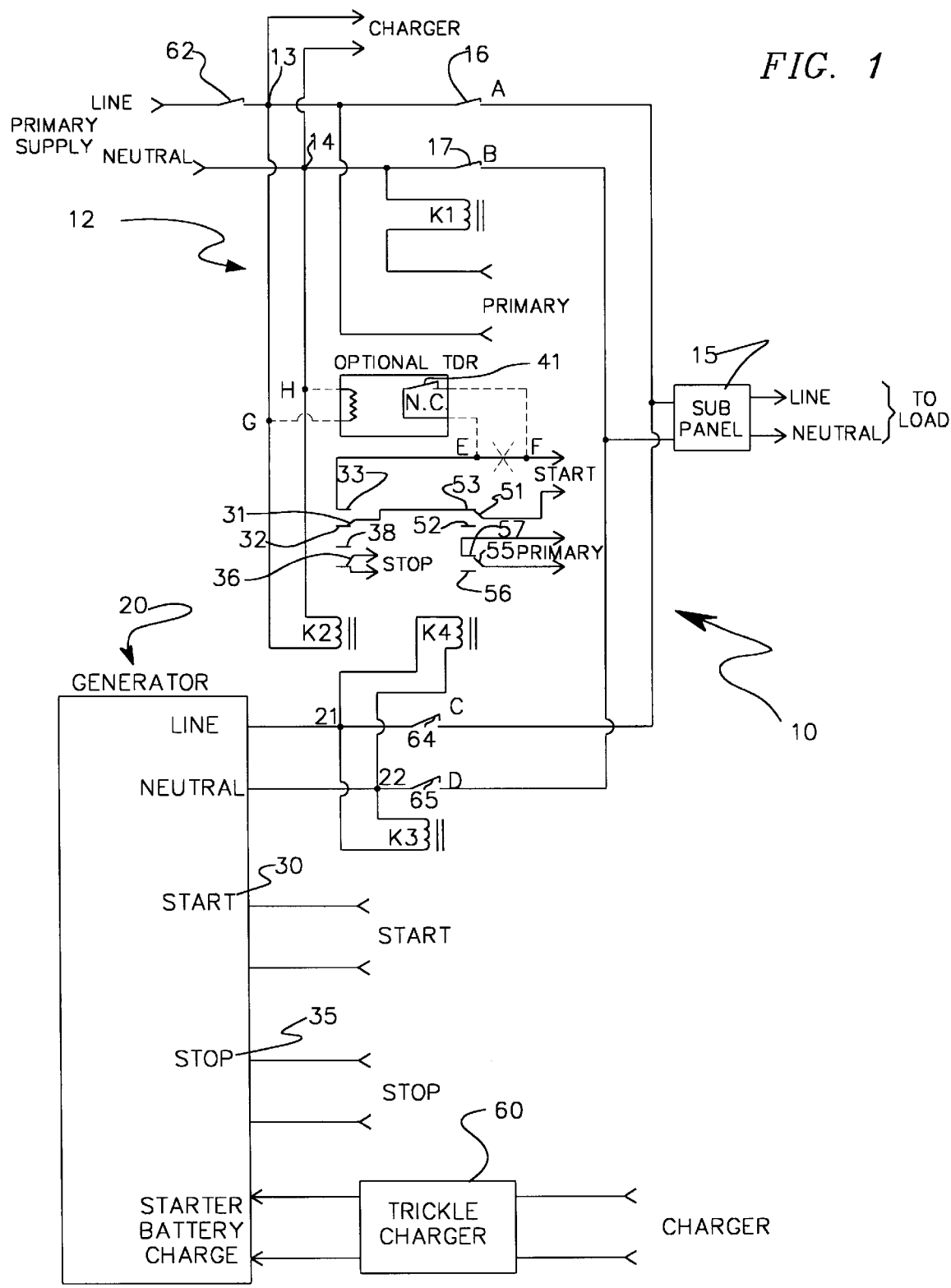
FIG. 1 is a schematic diagram of a new Power Transfer System according to the present invention.

With reference now to the drawings, and in particular to FIGS. 1 through 2 thereof, a new Power Transfer System embodying the principles and concepts of the present invention and generally designated by the reference numeral 10 will be described.

More specifically, it will be noted that the Power Transfer System 10 comprises a first relay denoted K1 for coupling the primary power supply 12 to the load (not shown) through a sub panel 15 such as would be found in a typical residence or small business. A second relay denoted K2 is responsive to a failure of the primary power supply 12 and activates start means 30 and deactivates stop means 35. A third relay denoted K3 is responsive to power supplied by an auxiliary power supply 20 and couples the auxiliary power supply 20 to the load through the sub panel 15. A fourth relay denoted K4 is responsive to power supplied by the auxiliary power supply 20 and decouples the primary power supply 12 from the load and deactivates the start means 30. In an alternative embodiment, a time delay relay 40 is provided for delaying the activation of the start means 30.

With reference to FIG. 1 the output terminals 13 and 14 of the primary power supply 12 are shown normally coupled to the load through the sub panel 15. The auxiliary power supply 20 is provided with output terminals 21 and 22 and start means 30 and stop means 35. The auxiliary power supply 20 of the preferred embodiment is a gas or propane powered generator having known start means 30 such as a battery powered starting motor and stop means 35 such as a kill switch. The auxiliary power supply 20 is housed in a location external to the residential or small business structure or is appropriately vented. Additionally a trickle charger 60 powered by the primary power supply 12 is provided for charging a battery (not shown).

Switching means which may include relays K1, K2, K3 and K4 provide the circuitry for switching the load from the primary power supply 12 to the auxiliary power supply 20 upon a failure of the primary power supply 12. The circuitry also switches the load back to the primary power supply 12 upon the restoration of primary power. Additionally, the circuitry decouples the primary power supply 12 from the load upon a failure in the primary power supply 12. Relays K1, K2, K3 and K4 are preferably electromechanical and suited to the voltage and load demands of the particular application.

In operation, under normal conditions the primary power supply 12 is supplying power to the load through the sub panel 15. Relay K2 is energized and contact arm 31 is held at contact 32 deactivating the start means 30 and contact arm 36 is held at contact 37 activating the stop means 35. Relay K4 is not energized and contact arm 55 is held at contact 57 thereby coupling relay K1 to the primary power supply 12 and energizing it to hold contact arms 16 and 17 closed at points A and B providing power from the primary power supply 12 to the load. Relay K3 is not energized and contact arms 64 and 65 are held open at points C and D thereby decoupling the auxiliary power supply 20 from the load.

Upon the loss of power from the primary power supply 12, relay K2 is de-energized and contact arm 31 contacts contact 33 activating the start means 30. Contact arm 36 contacts contact 38 deactivating the stop means 35. Relay K4 is energized upon being powered by the auxiliary power supply 20 and contact arm 55 contacts contact 56 thereby holding open the circuit from the primary power supply 12 to the load for as long as the auxiliary power supply 20 is supplying power to the load. Contact arm 51 is held at contact 52 to deactivate the start means 30. Relay K3 is similarly energized upon being powered by the auxiliary power supply 20 and contact arms 64 and 65 close at points C and D to couple the auxiliary power supply 20 to the load.

Upon the restoration of power from the primary power supply 12, relay K2 is energized and contact arm 36 contacts contact 37 activating the stop means 35. Contact arm 31 contacts contact 38 and the start means 30 is deactivated. Relay K3 is de-energized and contact arms 64 and 65 open to decouple the auxiliary power supply 20 from the load. Relay K4 is similarly de-energized and contact arm 51 contacts contact 52 to deactivate the start means 20. Contact arm 55 contacts contact 57 to close the primary power supply circuit to the load through relay K1 and contact points A and B.

A trickle charger 60 is shown powered by the primary power supply 12 for supplying a charge to a battery (not shown). A SPST switch 62 is also shown for testing the system.

In an alternative embodiment, a time delay relay 40 well known in the art is shown having a heating resistor R1. Switching means 41 is normally closed. Upon connection of the time delay relay 40 to the primary power supply 12 at points G and H and to the start means circuit at points E and F, the resistor R1 produces heat and switching means 41 opens. Upon the loss of power in the primary power supply 12, heat is dissipated and after a pre-determined amount of time, switching means 41 closes activating the start means 20.

With reference to FIG. 2, in the preferred embodiment relays K1, K2, K3 and K4 are housed in a single enclosure 70.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by Letters Patent of the United States is as follows:

1. A power transfer system for connecting a load normally connected across a primary power supply across an auxiliary power supply having a start means and a stop means upon a failure of the primary power supply comprising:

a first two pole—single throw relay for coupling the primary power supply to the load;

a first two pole—two throw relay responsive to the failure of the primary power supply, said first two pole—two throw relay for activating the start means and deactivating the stop means;

a second two pole—single throw relay responsive to power supplied by the auxiliary power supply, said second two pole—single throw relay for coupling the auxiliary power supply to the load;

a second double pole—double throw relay responsive to power supplied by the auxiliary power supply, said second double pole—double throw for decoupling the primary power supply from the load and deactivating the start means;

a time delay relay responsive to the failure of the primary power supply, said time delay relay for activating the start means after a predetermined time delay period from the time of failure of a primary power supply.

2. The power transfer system of claim 1, further comprising a trickle charger coupled to the primary power supply, said trickle charger for charging a starter battery coupled to the start means.

3. The power transfer system of claim 1 further comprising a switch interposed between the primary power supply and the load, said switch for decoupling the primary power supply from the load.

4. A power transfer system for connecting a load normally connected across a primary power supply across an auxiliary power supply having a start means and a stop means upon a failure of the primary power supply, the power transfer system comprising:

a first double pole—single throw relay for coupling the primary power supply to the load;

a first double pole—single throw relay responsive to the failure of the primary power supply, said first double pole—single throw relay for activating the start means and deactivating the stop means;

a second double pole—single throw relay responsive to power supplied by the auxiliary power supply, said second double pole—single throw relay for coupling the auxiliary power supply to the load;

a second double pole—double throw relay responsive to power supplied by the auxiliary power supply, said second double pole—double throw relay for decoupling the primary power supply from the load and deactivating the start means;

a time delay relay responsive to the failure of the primary power supply, said time delay relay for activating the start means;

a trickle charger coupled to the primary power supply, said trickle charger for charging a starter battery coupled to the start means; and a switch interposed between the primary power supply and the load, said switch for decoupling the primary power supply from the load.

* * * * *